UNITED STATES PATENT OFFICE.

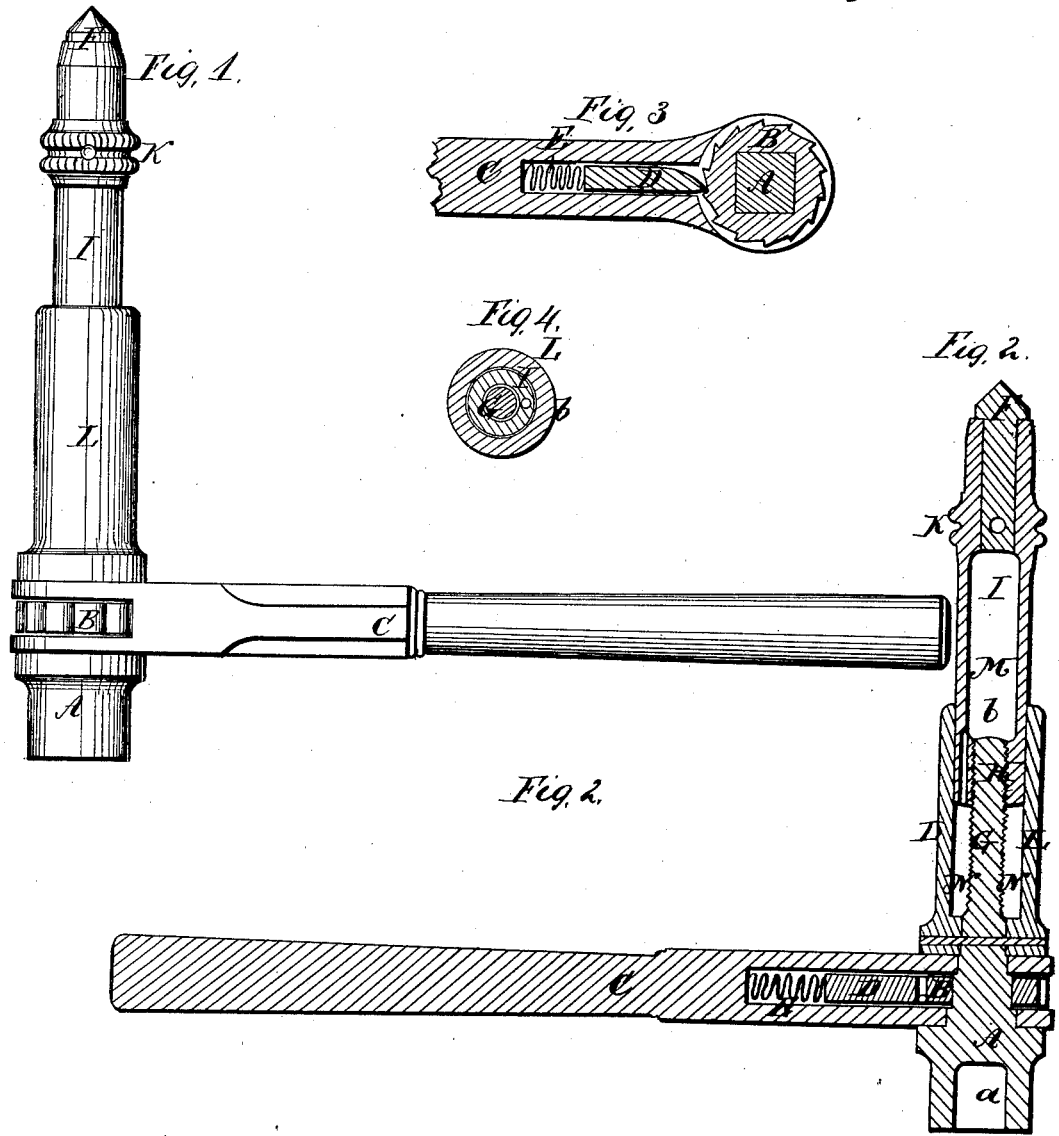

J. H. PARKER, OF BOSTON, MASSACHUSETTS, ASSIGNOR TO E. H. ASHCROFT, OF SAME PLACE.

HAND-DRILL.

Specification of Letters Patent No. 28,328, dated May 15, 1860.

*To all whom it may concern:*

Be it known that I, JAMES H. PARKER, of Boston, in the county of Suffolk and State of Massachusetts, have invented an Improved Hand-Drill or Rotary Drill-Stock; and I do hereby declare that the same is fully described and represented in the following specification and the accompanying drawings, of which—

Figure 1, is a side elevation; Fig. 2, a longitudinal section of the same. Fig. 3, a transverse section taken through the hand lever thereof. Fig. 4, is a transverse section taken through the male feeding screw.

In such drawings, A, denotes the drill carrier as provided with a socket a, for reception of the head of a drill or boring tool. This carrier A, is also provided with a ratchet B, and an operating lever C, arranged with respect to one another as shown in Figs. 1, 2, and 3, the lever being so as to carry a pawl or click D, that is forced against the circumference or teeth of the ratchet by means of a spring E. By moving the lever C, in one direction in a plane at right angles to the axis of the carrier A, the pawl will be made to so engage with the ratchet as to put it and the carrier in rotation, a backward movement of the lever causing the pawl to slip over or on the ratchet teeth and thereby create no movement of the ratchet. Thus, it will be seen that the rotary motion of the drill carrier is produced by a reciprocating motion of the hand lever C, whose fulcrum is the drill carrier, the lever being so applied to the carrier as to encompass and be able to be turned on it. Futhermore, the said carrier is furnished with a separate bearing pivot F, which is applied to it by means of male and female feeding screws, G, H. The male screw G, is extended upward directly from the carrier and in line with its axis and works in the female screw H, attached to the lower end of a tubular cylindrical shank I, which connects the female screw H, and the bearing pivot F, and is provided with a milled handle K, which is arranged near to the pivot.

The hollow shank I, as well as the screw G, is encompassed by a tubular cap and oil holder L, which projects upward from the carrier A, concentrically with the screw G, and has an internal diameter corresponding with or a very little greater than the external diameter of the hollow shank I. One or more short passages b, may be made through the bottom of the shank I, so as to open a communication between the chambers M, and N, of the parts L, and I.

If we now suppose the chamber N, to be supplied with oil for the purpose of lubricating both the screws G, H, and those surfaces of the parts I, and L, which run in contact with each other, we should find that whenever the shank I, is screwed down upon the lubricating fluid so as to compress it, the pressure on the fluid will cause it to pass through the passage b, into the chamber M. The fluid may also be made to pass from one chamber into the other by simply inverting or sufficiently turning the hand drill. This affords an easy method of thoroughly lubricating the screws and the rubbing surfaces. Furthermore as these screws are completely encased within the cap L, they will be protected from dust, borings or other extraneous matter tending either to produce friction and wear of them or to interrupt their correct action, and besides, the oil or lubricating fluid will not only be protected from waste and dust, but from the action of the atmosphere tending to acidify or oxygenate it.

By my improved arrangement of parts the cap L, serves also to guide and steady the part I, or to maintain the axes of the said part I, and pivot F, and the drill stock in one straight line while the hand drill may be in use.

As the screw G, serves to feed the drill downward or forward while it may be in the act of being rotated and as the part F, is stationary during such time there will be a great pressure on the threads of the screws and of course they are likely to soon become worn. Were I not to employ the cap L, in connection with the screws, they, particularly after having been worn would be apt to wabble so as to cause the axes of the drill and the pivot F, to deviate from a straight line, the consequence being more or less deviation of the boring tool from its proper course, all of which will be prevented by the employment of a guide cap in concert with the part I, as decribed, as these parts besides operating as oil holders and protectors of the screws act as guides to preserve the axis of the drill in a straight line with its pivot F.

I do not claim the combination of two cylindrical shells with the feed screws and other parts of the hand drills; nor the arrangement of the male screw as set forth, and the bearing pivot as represented in the United States Patent No. 20728, as I use, but one shell or cap and I extend the male screw directly upward from the drill carrier and thereby am enabled to form around such by the cap, an oil reservoir, in which the oil may be retained around the screw.

I claim—

1. My improved hand drill as constructed not only with the application of the male screw G, and a concentric oil holder or tubular cap L, directly to and so as to project from the drill carrier A, but with the tubular shank of the female screw extended directly from the pivot F, or a handle K intervening between the two as described.

2. I also claim so connecting the chambers M, N, by one or more passages b, separate from the female screw, that the oil may pass from one chamber into the other under circumstances and for the purpose set forth.

JAMES H. PARKER.

Witnesses:
R. H. EDDY,
F. P. HALE, Jr.